(12) United States Patent
Marsac

(10) Patent No.: US 7,025,089 B1
(45) Date of Patent: Apr. 11, 2006

(54) SYSTEM FOR ACCURATELY MEASURING CHOKE POSITION

(76) Inventor: Ian Marsac, 9837 Windmill Park La., Houston, TX (US) 77064

( * ) Notice: Subject to any disclaimer, the term of this patent is extended or adjusted under 35 U.S.C. 154(b) by 219 days.

(21) Appl. No.: 10/792,005

(22) Filed: Mar. 3, 2004

(51) Int. Cl.
*F16K 37/00* (2006.01)

(52) U.S. Cl. .................. 137/554; 116/66; 116/66.5; 116/250.01

(58) Field of Classification Search ............. 137/554; 166/66.5, 66, 250
See application file for complete search history.

(56) References Cited

U.S. PATENT DOCUMENTS

| | | | | |
|---|---|---|---|---|
| 3,964,553 A | * | 6/1976 | Basham et al. | 175/4.51 |
| 4,337,653 A | * | 7/1982 | Chauffe | 73/152.43 |
| 4,499,955 A | * | 2/1985 | Campbell et al. | 175/46 |
| 4,766,764 A | * | 8/1988 | Trevillion | 73/152.56 |
| 5,008,664 A | * | 4/1991 | More et al. | 340/854.8 |
| 6,588,505 B1 | * | 7/2003 | Beck et al. | 166/250.17 |
| 6,782,949 B1 | * | 8/2004 | Cove et al. | 166/368 |

* cited by examiner

*Primary Examiner*—A. Michael Chambers
(74) *Attorney, Agent, or Firm*—Buskop Law Group, P.C.; Wendy Buskop

(57) ABSTRACT

The system for accurately measuring choke position includes a choke position indicator; a choke adapted to control the flow of high pressure fluids during completion or drilling of a well, wherein the distance between the choke's gate to the choke's seat determines the amount of high pressure fluids that pass through the choke; a magnet mounted on the actuator shaft; a magneto/hall device mounted to the stationary housing for sensing the location of the magnet as the choke actuator shaft moves and providing an analog signal; a power wire connecting the magneto/hall device to a power source; a ground wire to ground the magneto/hall device; a signal wire to transmit the analog signal; an analog-to-digital converter for receiving and converting the analog signal to a digital signal; and a processor for converting the digital signal into choke shaft positions and transmitting the choke shaft positions to the choke position indicator.

14 Claims, 2 Drawing Sheets

SYSTEM FOR ACCURATELY MEASURING CHOKE POSITION

FIELD

The present embodiments relate to a system for measuring choke position in order to accurately regulate the volume of the high pressure fluids that pass though a given choke.

BACKGROUND

In the oil and gas industry, well and reservoir testing and management is an important aspect of efficient and economical production of oil and gas. During initial flow back and testing of a well, fluid flow, such as the oil and gas being produced, needs to be monitored and controlled. There are various flow sensing devices, flow control devices, and valves used to perform these functions. With changes in the industry, however, there is the need for improved tools and measurement methods.

One of these changes is that more complex wells are being drilled. For example, horizontal wells and wells with multiple lateral bores extending from a main borehole are being drilled to improve hydrocarbon recovery rates at reduced cost relative to drilling multiple individual vertical wells.

A need exists for an improved system that can be used in surface assemblies to control and monitor fluid flow. A need exists for an assembly that can accurately measure the choke position to accurately control the flow rate. The present embodiments have been developed to meet that need.

SUMMARY

The invention is for a system for accurately measuring actuator position on a choke. The choke controls the flow of high pressure fluids during drilling and completion of a well. The choke has a stationary housing that contains a hydraulic cylinder connected to a choke actuator. The choke has an internal gate that moves towards or away from a choke seat based upon the movement of the hydraulic cylinder and the connected actuator shaft. The volume of high pressure fluids that can pass though the choke is based upon the distance between the gate and the choke seat.

The system includes a choke positioning indicator connected to a magneto hall device for sensing the proximity of a magnet mounted on the choke actuator shaft to the Hall device. The magneto/Hall device senses the location of the magnet as the choke actuator shaft moves back and forth and the Hall device provides an analog signal corresponding to the distance from the magneto/Hall device to the magnet. An analog-to-digital converter converts the analog signal to a digital signal and sends the digital signal to a processor. Based upon the digital signal output, the processor sends a signal to the choke position indicator to indicate the position of the gate relative to the seat.

BRIEF DESCRIPTION OF THE DRAWINGS

In the detailed description of the preferred embodiments of the system presented below, reference is made to the accompanying drawings, in which.

The present system is detailed below with reference to the listed Figures.

DETAILED DESCRIPTION OF THE PREFERRED EMBODIMENTS

Before explaining the present system in detail, it is to be understood that the system is not limited to the particular embodiments and that it can be practiced or carried out in various ways.

Figure 1:
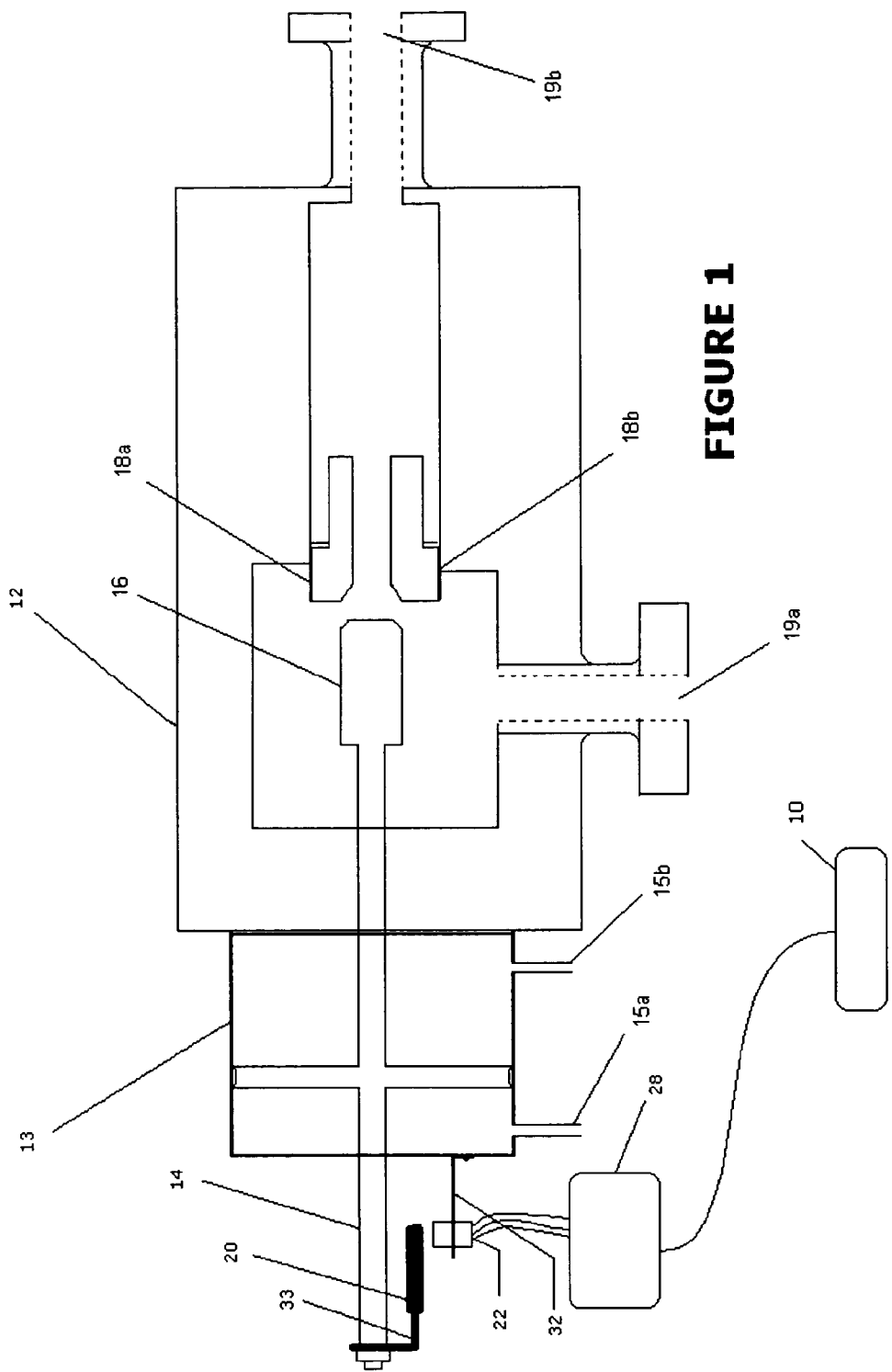
FIG. 1 depicts a representation of system for accurately measuring choke position with a linear output setting.
Figure 1A:
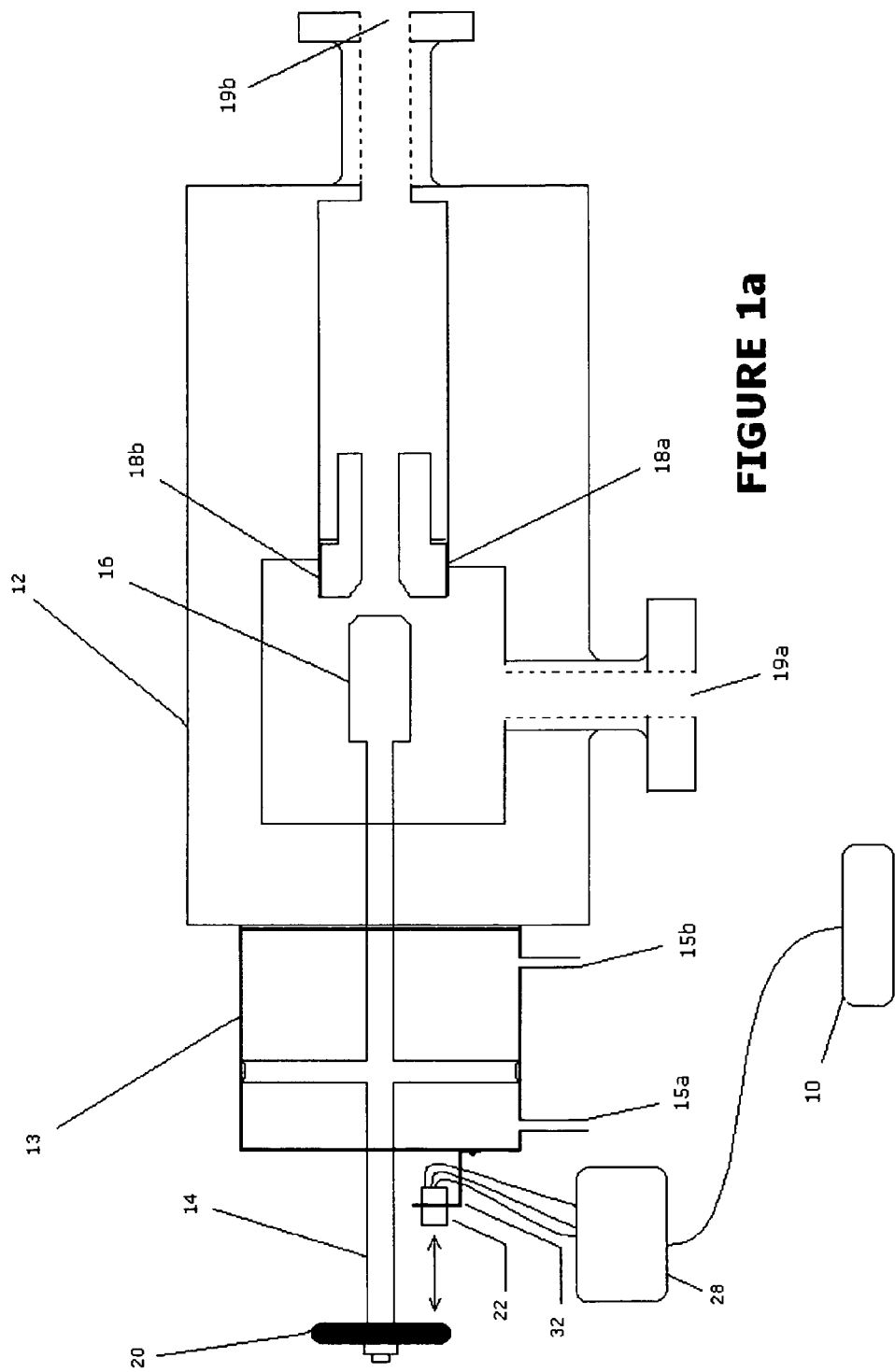
FIG. 1a depicts a representation of system for accurately measuring choke position with a non-linear output setting.

With reference to the Figures, FIG. 1 and FIG. 1a are representations of the system for accurately measuring choke position with a linear and non-linear output setting, respectively.

The choke (11) in the system is adapted to control the flow of high pressure fluids such as oil or gas, during drilling or completion of a well. The choke (11) can be either a hydraulically actuated or a manually operated choke.

The choke (11) has a stationary housing (12) that contains a hydraulic cylinder (13). The hydraulic cylinder (13) operates the choke actuator shaft (14) with a gate (16). The hydraulic cylinder (13) moves the choke actuator shaft (14) with gate (16) towards or away from the choke seat (18a and 18b). FIG. 1 depicts the embodiment wherein the hydraulic cylinder (13) has hydraulic connections (15a and 15b) for the flow of hydraulic in and out of the hydraulic cylinder (13).

The volume of high pressure fluids, such as high pressure gas and high pressure oil and high pressure water, steam, and mixtures, that can flow though the choke (11) is dependent upon the distance between the gate (16) and the choke seat (18a and 18b). FIG. 1 depicts the typical inlet (19a) and outlet (19b) on a choke (11). The choke controls the flow and, for safety reasons, an accurate device to measure the actuator position. The accurate device uses a magnetic detection mechanism. The accurate device is inexpensive to install and maintain.

Continuing with FIG. 1, a choke position indicator (10) and a magnet (20) are shown. The choke position indicator (10) can be a human-machine interface, such as a dial, an LCD display, a plasma screen television, or a CRT. The magnet (20) is mounted on the choke actuator shaft (14). Preferably, the magnet (20) is mounted on the extreme end of the choke actuator shaft (14) opposite the gate (16). The magnet (20) optionally can be mounted to the choke actuator shaft (14) with a bracket for increased durability during use.

A magneto/hall device (22) is used for sensing the location of the magnet (20) as the choke actuator shaft (14) moves. The magneto/hall device (22) is mounted to the stationary housing (12) preferably threaded into the housing and provides an analog signal (46) to an analog-to-digital converter (28), using a single wire and a ground wire, such as a color coded green signal wire and a black ground wire.

The magneto/hall device (22) is preferably protected with a housing. The device includes a semiconductor chip that scales the electrical signals generated by the Hall device based on the proximity of the Hall device (22) (and chip) to the magnetic field of the magnet.

The magneto/Hall device (22) can be attached inside the choke housing (12) adjacent the hydraulic cylinder (13). The magneto/hall device housing can be mounted to the choke housing using threads (33) located on the outside of the housing of the magneto hall device for engaging the magneto/hall housing with the choke housing.

The analog-to-digital converter (28) preferably, is a microcontroller circuit, such as a PIC, model 18F452 or other suitable processor.

The invention includes a power wire (24) which connects the magneto/hall device (22) with a power source (40). A ground wire (26) is also used to connect the magneto/hall device (22) to a grounded source (42). Preferably, the ground wire (26) is color coded black and the power wire (24) is color coded red.

A processor (30) receives the digital signal from the analog-to-digital converter (28) and transmits the digital signal to the choke position indicator (10). The choke position indicator (10) can be connected to devices which actuate the hydraulic cylinder (13) and move the choke actuator shaft (14) into desired positions. Processors usable in the invention include computer processors, such PC's, or other computers.

FIG. 1a depicts the system for accurately measuring choke position with a non-linear output setting.

As the choke's actuator shaft (14) moves in and out due to the movement of the hydraulic cylinder (13), the magnet (20) attached to the actuator shaft (14) moves in conjunction with the force applied by the hydraulic cylinder (13). The magnet (20) produces as magnetic field (21). The magnetic strength of the field is sensed by the magneto/hall device (22), which in turn, produces an analog signal that is sent to the analog-to-digital converter (28). The analog-to-digital converter (28) converts the analog signal to a digital signal and sends the digital signal to a processor, which displays the choke position. The analog-to-digital converter (28) can be a PC or dedicated instrument. A PC could also be utilized as a display device and is a secondary embodiment.

The processor performs the necessary calculations to determine the location of the gate (18) based upon the digital signal. The processor sends a processed digital signal to the choke position indicator (10). The choke position indicator (10) is a human machine interface that can be connected to other devices to accurately report the location of the shaft, such as the internet for remote control of one or more chokes and remote monitoring of a plurality of chokes for safety reasons (11).

The system has been described in detail with particular reference to certain preferred embodiments thereof, but it will be understood that variations and modifications can be effected within the scope of the system, especially to those skilled in the art.

What is claimed is:

1. A system for accurately measuring choke position comprising:
   a. a choke position indicator;
   b. a choke adapted to control the flow of high pressure fluids during completion of a well comprising a stationary housing for containing a hydraulic cylinder or manual operator, a choke actuator shaft with a gate, disposed in the housing connected to the hydraulic cylinder or manual operator wherein the hydraulic cylinder or manual operator moves the choke actuator shaft with gate towards or away from a gate seat, and wherein the distance between the gate to the gate seat determines the amount of high pressure fluids that pass through the choke;
   c. a magnet mounted on the choke actuator shaft;
   d. a magneto/hall device for sensing the location of the magnet as the choke actuator shaft moves, wherein said magneto/hall device is mounted to the stationary housing and provides an analog signal;
   e. a power wire connecting the magneto/hall device to a power source;
   f. a ground wire to ground the magneto/hall device;
   g. an analog-to-digital converter for receiving the analog signal from the magneto/hall device and converting the analog signal to a digital signal; and
   h. a processor in communication with the digital to analog converter for converting the digital signal into choke shaft positions and transmitting the choke shaft positions to the choke position indicator.

2. The system of claim 1, wherein the analog-to-digital converter is a microcontroller.

3. The system of claim 1, wherein the choke position indicator is a human/machine interface.

4. The system of claim 3, wherein the human/machine interface is selected from the group consisting of a dial, an LCD display or; a plasma screen television.

5. The system of claim 1, wherein the magnet is mounted on the choke actuator shaft opposite the gate.

6. The system of claim 5, wherein the magnet is mounted on a bracket mounted to the choke actuator shaft.

7. The system of claim 1, wherein the magneto/hall device is mounted to the inside of the stationary housing proximate to the hydraulic cylinder or manual operator.

8. The system of claim 1, wherein the choke is hydraulically actuated or manually operated.

9. The system of claim 1, wherein the magneto/hall device comprises a housing containing a Hall device and semiconductor device for scaling electrical signals based on the proximity of the magneto/hall device to the magnet.

10. The system of claim 9, wherein the magneto/hall device is mounted to the stationary housing using threads disposed on the outside of the housing of the magneto hall device.

11. The system of claim 1, wherein the fluids are high pressure gas, high pressure oil, high pressure water, steam or combinations thereof.

12. The system of claim 1, wherein the ground wire is black and the power wire is red.

13. The system of claim 1, wherein the magneto/hall device communicates with the analog-to-digital converter with a signal wire.

14. The system of claim 13, wherein the signal wire is color coded green.

* * * * *